July 21, 1964 A. C. DIRIENZO 3,141,922
MULTICONDUCTOR PRESSURE FITTING
Filed June 21, 1962
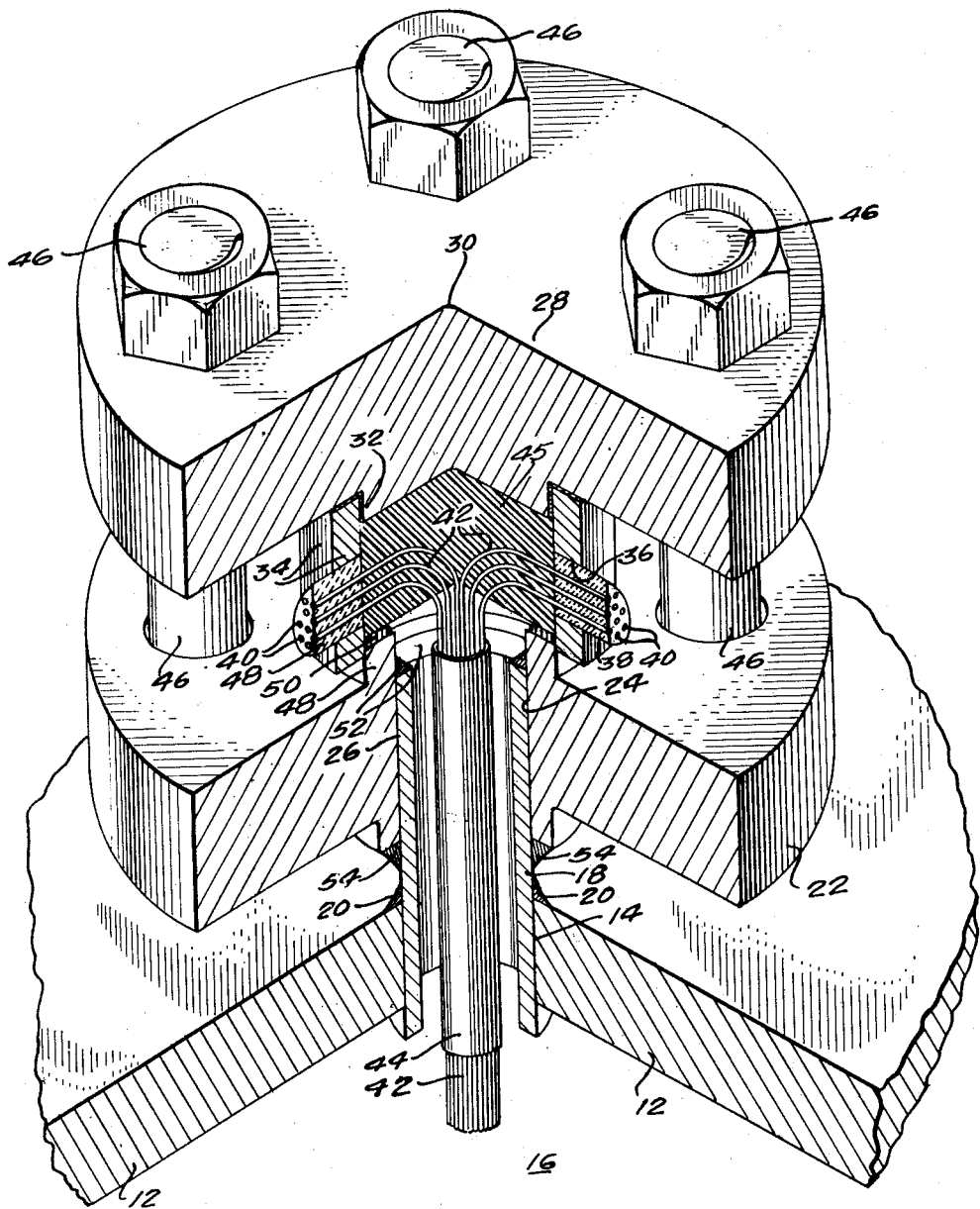
INVENTOR
ANTHONY C. DIRIENZO
BY
Richard H. Thomas
ATTORNEY

United States Patent Office 3,141,922
Patented July 21, 1964

3,141,922
MULTICONDUCTOR PRESSURE FITTING
Anthony C. Dirienzo, Millington, N.J., assignor to Foster
Wheeler Corporation, New York, N.Y., a corporation
of New York
Filed June 21, 1962, Ser. No. 204,109
8 Claims. (Cl. 174—18)

This invention relates to a multiconductor fitting or method adapted to carry a plurality or large number of conductors through the wall of a vessel, and in particular to a fitting or method adapted to carry a large number of conductors through a wall which may be either a pressure barrier or a heat barrier.

One particular use contemplated for the invention is in connection with passing a large number of wires through the wall of a pressure vessel, where the fitting must be capable of withstanding an extremely high pressure within the vessel. Such vessels include feed water heater closures and shells, reactor vessels, steam drums, and headers.

These vessels may be designed to withstand a high internal pressure of many thousands of pounds per square inch, and it is often desirable to conduct a stress analysis on the vessels when they are under pressure. For this purpose, a large number of strain gauges will be disposed at a variety of points in a vessel, with wires leading from them to the outside. Any fitting used to carry the wires through the vessel wall must be capable not only by handling the large number of wires but at the same time capable of withstanding the high internal pressures.

In addition, it is contemplated that the invention will be useful for carrying a large number of pressure taps or sample lines from a distillation column or similar vessel also subjected to high internal pressures. Further, in connection with steam generators, and also nuclear reactors and similar heat transfer equipment, it may be desirable to take temperature measurements at a variety of points and for this purpose to carry a large number of thermocouple wires through the vessel wall. The present invention provides a useful fitting for this purpose. In general, the invention will be useful where it is desired to convey a large number or plurality of wires through any pressure or heat barrier.

In accordance with the invention, there is provided a multi-conductor fitting for a vessel, which may be either a pressure vessel or a high temperature vessel, the vessel wall acting as a pressure or heat barrier and having an opening therein through which the conductors extend, comprising a first disc-like backing flange member having a solid, preferably raised, center backing portion, and a complementary second flange member having a center opening therein for the passage of the conductors. The second flange member is adapted to be affixed to the vessel wall with the opening therein in communication with the vessel opening, and means are provided to clamp the flange members firmly together, preferably a plurality of bolts disposed around the periphery of the flanges.

In a preferred embodiment, a sleeve element or member, having a cylindrical configuration, is positioned between the flange members with one end thereof disposed over and being located by the raised center portion of the first backing flange member. The sleeve element is provided with a plurality of radial openings around its periphery with a grouping insulator disposed in each opening. For the purpose of this specification, a grouping insulator is a standard commercial item formed from a ceramic or easily worked material and having a plurality of holes or perforations through which conductors may extend. Their function is to support the conductors and insulate them from each other and a main support member.

The conductors are disposed within the fitting as a bundle or group extending through the vessel wall and second flange member openings. Between the flange members the conductors are divided so as to extend radially through the sleeve openings and perforations of the grouping insulators, and a hardenable material is cast into the sleeve and around the conductors forming a block adapted to be clamped between the flange members and to seal the second flange member opening.

Preferably, the conductors are bundled together within a cylindrical bundling tube and are ground or divided into a number of groups and bent at 90° with respect to the bundling tube, each group going into an appropriate opening in the casting sleeve. A material such as an epoxy resin having a high compression strength is cast into the casting sleeve against the backing flange. An excess amount of material may be placed in the sleeve forming a bubble across the top to compensate for shrinkage, and after curing or hardening, the free face of the epoxy block is machined to present a smooth, sealing surface.

The second or complementary flange member affixed to the vessel wall preferably is provided with a raised annular portion on which a gasket is seated. The machining of the free face of the epoxy block is to a depth allowing a clearance between the casting sleeve and the outer surface of the lower mating flange so that when the flange members are clamped together, the compression load is taken only by the gasket.

Longitudinal forces caused by high pressures within the vessel are taken through the epoxy block and absorbed by the solid backing flange and bolts holding the flange members together. Hoop stresses are absorbed by the casting sleeve.

In instances where the pressures are small within the vessel and high temperatures may be involved, then the casting sleeve may or may not be used depending upon design considerations. The cast block, however, sealing the lower flange opening would be of a heat-resistant material such as a ceramic.

The radial openings in the sleeve and the grouping insulators, if the latter are used, should be arranged or spaced so as not to interfere with the flange bolts or other means holding and clamping the flange members together.

It will be apparent that the present invention provides an extremely useful assembly for carrying a plurality of conductors through a pressure or heat barrier where pressures on opposite sides of the barrier differ. Not only does the assembly seal the barrier opening, but it is also capable of handling a large number of conductors in an easy and inexpensive manner. In addition, the assembly may be designed to withstand extremely high differences in pressures.

The invention and advantages thereof will become more apparent upon consideration of the accompanying drawing in which there is illustrated a fragmentary isometric view of a pressure fitting in accordance with the invention.

Referring to the drawing, there is illustrated a vessel wall 12 having an opening 14 leading to the inside 16 of the vessel. A tubular member 18 is disposed within the opening welded by welds 20 to the outside of the vessel wall. A disc-like flange member 22 having an opening 24 through its center is secured to the outer end 26 of the tubular member.

A second backing flange member 28 having a solid, center portion 30 is spaced from a first flange 22. The backing flange 28 has on its inner surface facing the flange 22 a raised center portion 32. Over the raised portion, a cylindrical casting sleeve 34 is disposed with a close fit existing between the sleeve and the raised portion.

The casting sleeve 34 is provided with a plurality of radial holes or openings 36 around its periphery adapted to receive or seat grouping insulators 38, the insulators having a plurality of holes or perforations 40 therein.

As illustrated in the drawing, the conductors 42 are bundled together within a bundling tube 44, above which they are grouped together into a number of groups and bent at 90° so as to extend radially through the grouping insulator openings 40 to the outside of the casting sleeve.

Prior to assembly, the flange 28 is turned upside down with the raised center portion 32 facing upwardly. The casting sleeve 34 is disposed over the raised portion forming a close fit therewith. The correct number of conductors are bundled together within the bundling tube 44, and then are grouped and bent at 90°, each group extending through an appropriate opening in the casting sleeve 34. The individual conductors are passed through the holes 40 of the grouping insulators, after which the latter are inserted in the openings within the casting sleeve.

A casting material is mixed in the correct proportions and poured into the casting sleeve, using an excess amount to form a bubble across the top compensating for shrinkage. After curing or hardening, the face of the hardened block, designated by numeral 45, is machined to a smooth surface.

Subsequently, the backing flange 28 is turned right side up with the conductors 42 and bundling tube 44 extending through the tubular member 26 and vessel opening 14, and the flanges are clamped together by spaced bolts 46. As illustrated, the casting sleeve openings 36 are positioned so that the grouping insulators and conductors avoid interference with the bolts.

The lower flange 22 is provided with an annular ridge portion 48 disposed around its upper surface and surrounding the inner flange opening 24, and a ring gasket 50 is seated on the raised portion 48. When the flange members are clamped together, the machined surface of the cast block 45 is brought to bear on the gasket. Preferably, the cast block has been machined to a depth which allows a clearance between the casting sleeve 34 and the lower mating flange 22 so that the compression load is taken completely by the gasket.

Machining the surface of the cast block 45 below the free surface of the casting sleeve also serves to locate the gasket 50, and in addition prevents extrusion of the gasket outwardly under extreme pressures within the vessel.

To adapt the assembly to high pressures, the casting sleeve must be capable of absorbing hoop stresses imposed on the cast block, and for this purpose, it is desired to use a steel or high tension strength metal casting sleeve. The cast block 45, in addition to being capable of absorbing high compression forces, must be of a material which solidifies without the formation of air bubbles, permitting a smooth uninterrupted surface to be machined on the block for contact with the gasket. Although many resins may be suitable, it was found that a No. 2200 epoxy resin, cured with a No. 21 hardener and manufactured by Epoxy Products, a division of Joseph Waldman & Sons, when cured had an extremely high compressive strength, and further cohered to the steel sleeve and steel backing flange. When cured for twenty-four hours, the cast block had a compressive strength of 17,000 p.s.i.

Although many gaskets may be useful in the invention, it is found that a copper-jacketed, asbestos filled gasket provides extremely suitable results.

For the purpose of transmitting current for strain gauge measurements, the wires used were nylon insulated and bundled in a polyethylene wire bundling tube. The nylon insulation bonded well with the epoxy resin preventing the leakage of air around the conductors. The polyethylene wire bundling tube prevented chafing of the wires against rough edges in the tubular member or vessel wall and wearing away of insulation.

The grouping insulators are items which can be purchased on the market. In general, they may be of a ceramic material, or of polytetrafluoroethylene sold under the registered trademark "Teflon," polyethylene, or some similar, easily worked material. The flange members also are items purchased on the open market. Generally, any two flange members, one having a solid backing portion, and the other an opening therein may be used.

In actual practice, the lower mating flange could be any raised-face standard type flange, for instance, a threaded flange, a socket-welded flange or a butt weld-connection flange. In the example illustrated the flange 22 is a ¾ i.p.s., 1500 p.s.i. forged steel slip-on flange pressure fitting.

In the example illustrated, the lower mating flange is affixed to the tubular member 18 by being welded at inside and outside points 52 and 54. This provides a secure joint. In order to achieve the inner weld 52, some clearance is allowed between the top or outer surface of the flange 22 and the upper end of the tubular member 18.

Although the invention has been described with reference to a fitting useful for high internal pressures, the principles may be applied for leading pressure taps or sample lines from a distillation column or thermocouples from a heat exchange unit or the like. In the latter case, the cast block 45 may be then of a ceramic material or other heat-resistant material. Also the wire bundling tube would be of a material capable of withstanding high temperatures.

Other modifications will be apparent to those skilled in the art, and the spirit and scope of the invention is not limited except as defined in the following claims.

What is claimed is:

1. A multiconductor pressure fitting for a pressurized vessel having an opening in a wall thereof through which a plurality of conductors extend comprising a backing flange member, a complementary second flange member having an opening therein for the passage of said conductors, said second flange member being affixed to said vessel wall with the opening therein in communication with the vessel opening, means to clamp said flange members firmly together, a sleeve element independent of but disposed between said flange members having a plurality of radial openings therein, a plurality of conductors extending through said vessel and flange openings and in groups radially through said sleeve element openings, a sealing block of a castable, hardenable material capable of withstanding compression forces cast within said sleeve element around said plurality of conductors, means centering said sleeve element and sealing block such that the latter covers and seals said opening in said second flange member.

2. A multiconductor pressure fitting assembly for a pressurized vessel having an opening in a wall thereof comprising a backing flange member having a solid raised center portion; a complementary second flange member having a center opening therein, said second flange member being affixed to said vessel wall with the opening therein in communication with the vessel opening; means to clamp said flange members firmly together; a sleeve member disposed between said flange members and over said backing flange raised center portion engaging the latter and being located thereby, said sleeve member having a plurality of radial openings therein; a large number of conductors in groups extending radially through said sleeve openings and axially from said sleeve through said second flange opening and vessel wall opening; a block of castable, hardened material capable of withstanding high compression forces disposed within and substantially filling said sleeve, said block having opposed faces one face of which is disposed against said raised center portion of said backing flange, the other face being disposed against said second flange covering the opening therein; and means for sealing said other face with said second flange.

3. An assembly according to claim 2 wherein said castable, hardened material is an epoxy resin capable of hardening without the formation of air bubbles.

4. An assembly according to claim 2 in which said other face is machined to form a smooth sealing surface and wherein said last mentioned means comprises a continuous, annular raised surface on said second flange surrounding said flange opening and a gasket seated on said raised surface capable of withstanding high tension forces.

5. An assembly according to claim 4 wherein said machined face is machined to a depth within the sleeve so that said block takes the full compression load.

6. A multiconductor pressure fitting assembly for a pressurized vessel having an opening in a wall thereof comprising a first flange member having a solid backing portion; a complementary second flange member having an opening therein aligned with said first flange solid backing portion, said second flange member being affixed to the vessel wall with the opening therein in communication with the vessel wall opening; means to clamp said flange members firmly together; a sleeve member disposed between said flange members arranged and aligned with said first flange backing portion and said second flange opening so as to encompass the latter, said sleeve member having a plurality of radial openings therein; a plurality of grouping insulators disposed in said sleeve openings; a plurality of conductors in groups extending through each insulator, said conductors being bundled together and extending axially from said sleeve through said second flange opening and vessel wall opening; a block of castable, hardened material capable of withstanding high compression forces disposed within and substantially filling said sleeve, said block having opposed faces one face of which is seated against said solid backing portion and the other face being disposed against said second flange covering the opening therein, and means for sealing said other face with said second flange.

7. A multiconductor pressure fitting for a pressurized vessel having an opening in a wall thereof through which a plurality of conductors extend comprising a tubular member affixed in sealing relationship with said opening having a radial disc-like flange secured to its outer end, the outer surface of the flange being that surface removed from the vessel wall, a cylindrical sleeve disposed on said flange outer surface and having radial openings in the periphery thereof, said conductors extending through said vessel wall opening and being branched so that groups of conductors extend outwardly through said cylindrical sleeve, grouping insulators of an easily worked material encasing said groups of conductors and seated in said openings, a block of a heat-resistant hardened material capable of withstanding high compression forces cast in said cylindrical sleeve substantially filling said sleeve, and means for clamping said cast block to the outer surface of said flange so that it seals the open end of said tubular member.

8. A multiconductor pressure fitting for a pressurized vessel having an opening in a wall thereof through which a plurality of conductors extend comprising a tubular member sealed to the vessel wall around said opening and having a flange at its free end, the outer surface of the flange being that surface removed from the vessel wall, a cylindrical sleeve adjacent said flange outer surface and coaxial with said tubular member having a plurality of radial openings in the wall thereof through which pass in an outwardly direction groups of conductors extending from said tubular member and wall opening, grouping insulators of an easily worked material encasing said groups of conductors and disposed in said radial openings, a block of heat resistant and hardened material capable of withstanding high compression forces cast in said cylindrical sleeve substantially filling the sleeve, means for clamping said cast block to the outer surface of the flange so that it seals the open end of said tubular member, said last named means including a gasket surrounding the tubular member open end and seated between said cast block and the outer surface of the flange.

References Cited in the file of this patent

UNITED STATES PATENTS

| | | |
|---|---|---|
| 1,588,804 | Parrish | June 15, 1926 |
| 1,907,599 | Smith | May 9, 1933 |
| 2,616,946 | Scheer | Nov. 4, 1952 |